(12) United States Patent
Staffenberger et al.

(10) Patent No.: US 11,835,192 B2
(45) Date of Patent: Dec. 5, 2023

(54) DISPLACEMENT SYSTEM FOR SIMULTANEOUS DISPLACEMENT OF LIGHT MODULES OF LIGHTING APPARATUS FOR MOTOR VEHICLE

(71) Applicant: ZKW Group GmbH, Wieselburg (AT)

(72) Inventors: Walter Staffenberger, Maria Laach (AT); Leopold Pritzl, Bergland (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/071,918

(22) Filed: Nov. 30, 2022

(65) Prior Publication Data

US 2023/0175661 A1 Jun. 8, 2023

(30) Foreign Application Priority Data

Dec. 3, 2021 (EP) .................................... 21212273

(51) Int. Cl.
*B60Q 1/04* (2006.01)
*F21S 41/19* (2018.01)

(52) U.S. Cl.
CPC .............. *F21S 41/192* (2018.01); *B60Q 1/04* (2013.01); *B60Q 2200/30* (2013.01)

(58) Field of Classification Search
CPC .......... F21S 41/192; F21S 41/36; F21S 41/60; F21S 41/675; F21S 41/67; F21S 41/65;
(Continued)

(56) References Cited

U.S. PATENT DOCUMENTS 6,773,153 B2 * 8/2004 Burton ................. B60Q 1/0686
362/531
2002/0054496 A1 * 5/2002 Fujino .................... B60Q 1/072
362/524
(Continued)

FOREIGN PATENT DOCUMENTS

EP 2394850 A1 12/2011
EP 3616993 A1 3/2020
(Continued)

OTHER PUBLICATIONS

Search Report for European Patent Application No. 21212273.3 dated May 25, 2022 (9 pages).

*Primary Examiner* — Omar Rojas Cadima
(74) *Attorney, Agent, or Firm* — Eversheds Sutherland (US) LLP

(57) ABSTRACT

A displacement system for simultaneous displacement of a first and a second light module of a lighting apparatus, wherein the first light module is mounted so that it can swivel about a first swivel axis and the second light module is mounted so that it can swivel about a second swivel axis, and wherein the two swivel axes extend parallel to each other. The displacement system includes a first and a second control shaft, wherein the control shafts are mounted so that they can be rotated about their respective longitudinal axis and moved linearly in the direction of their longitudinal axis, wherein the first and the second control shaft are connected in a torque-proof manner to a first and a second rotary element, so that when the first rotary element rotates, the first control shaft is rotated in the direction of rotation of the first rotary element, and when the second rotary element rotates, the second control shaft is rotated in the direction of rotation of the second rotary element, and wherein a third rotary element is provided, which cooperates with the first rotary element such that when the third rotary element rotates, the (Continued)

first rotary element is rotated, and wherein the first rotary element and the second rotary element cooperate such that when the first rotary element rotates, the second rotary element is rotated in the opposite direction to the direction of rotation of the first rotary element, and wherein the first and the second control shafts are mounted in such manner that as a consequence of the rotations by the first and second rotary elements caused by the rotation of the third rotary element they move linearly in opposite directions along their respective longitudinal axes, and wherein the swivel axes extend that the two light modules are swiveled simultaneously and in the same direction about their respective swivel axis.

15 Claims, 3 Drawing Sheets

(58) Field of Classification Search
CPC ........ F21S 41/63; F21S 41/635; F21S 41/657; B60Q 1/04; B60Q 2200/30; B60Q 1/245; F21W 2107/10; F21W 2102/00; F21Y 2115/10

See application file for complete search history.

(56) References Cited

U.S. PATENT DOCUMENTS

| 2005/0002201 | A1 | 1/2005 | Burton |
| 2014/0029278 | A1* | 1/2014 | Burton ................ B60Q 1/068 362/523 |
| 2016/0159271 | A1 | 6/2016 | Helwig |
| 2019/0061602 | A1 | 2/2019 | Matejka et al. |

FOREIGN PATENT DOCUMENTS

| JP | H03138801 A | 6/1991 |
| JP | 2012201186 A | 10/2012 |

* cited by examiner

DISPLACEMENT SYSTEM FOR SIMULTANEOUS DISPLACEMENT OF LIGHT MODULES OF LIGHTING APPARATUS FOR MOTOR VEHICLE

CROSS-REFERENCE TO RELATED APPLICATIONS

This application claims priority to European Patent Application No. 21212273.3, filed Dec. 3, 2021, which is incorporated herein by reference.

FIELD OF THE INVENTION AND DESCRIPTION OF PRIOR ART

The invention relates to a displacement system for simultaneous displacement of a first and a second light module of a lighting apparatus, wherein the first light module is mounted so as to be pivotable about a first swivel axis and the second light module is mounted so as to be pivotable about a second swivel axis, wherein the two swivel axes extend parallel to each other.

The invention relates further to a lighting apparatus, in particular a motor vehicle headlamp for a motor vehicle, the lighting apparatus comprising a first and a second light module, wherein the first light module is mounted so as to be pivotable about a first swivel axis and the second light module is mounted so as to be pivotable about a second swivel axis, wherein the two swivel axes extend parallel to each other.

Light modules of a lighting apparatus, e.g. of a motor vehicle headlamp, are used to produce light distributions or partial light distributions, e.g. from dipped beam or main beam distributions, etc.

It is necessary to be able to adjust these light modules in the vertical and/or horizontal direction relative to their home position so that they are aligned in the correct direction. This adjustment of the home position is often carried out manually.

SUMMARY OF THE INVENTION

In order for the light modules to be displaced, the light modules are pivotable about horizontal axes, for example, so that they can be pivoted vertically (i.e. upwards or downwards), thereby enabling the illumination range to be adjusted, and/or about vertical axes so that they can be pivoted horizontally (i.e. to the left or right), thereby enabling the lateral illumination direction to be adjusted.

The problem addressed by the invention is that of providing a displacement system with which two light modules of a lighting apparatus may be displaced together.

This problem is solved with a displacement system as described in the introduction in that that according to the invention the displacement system comprises:
  a first control shaft, which is coupled to the first light module,
  a second control shaft, which is coupled to the second light module,
wherein the first control shaft and the second control shaft are each mounted so as to be pivotable about their longitudinal axis, wherein the control shafts are each mounted in such manner that when a control shaft is rotated it moves linearly in the direction of its longitudinal axis,
wherein the first control shaft is connected in torque-proof manner to a first rotary element, embodied as a crown wheel for example, so that when the first rotary element is rotated the control shaft rotates in the direction of the first rotary element, and wherein the second control shaft is connected in torque-proof manner to a second rotary element, embodied as a crown wheel for example, so that when the second rotary element is rotated the second control shaft rotates in the direction of the second rotary element, and wherein a third rotary element is provided, embodied as a bevel gear for example, which cooperates with the first rotary element in such manner that when the third rotary element is rotated the first rotary element rotates, and wherein the first rotary element and the second rotary element cooperate in such manner that when the first rotary element is rotated the second rotary element rotates in the opposite direction to the direction of rotation of the first rotary element, and wherein the first and the second control shaft are mounted in such manner that as a consequence of the rotations of the first and second rotary elements brought about by the rotation of the third rotary element they move linearly in opposite directions along their respective longitudinal axes, and wherein the swivel axes extend in such manner that the two light modules are swiveled simultaneously and in the same direction about their respective swivel axis.

Thus, the third rotary element drives the first rotary element, which in turn drives the second rotary element, in counter-rotation, and the first and second rotary elements move the control shafts attached to them linearly in opposite directions, thereby swiveling the two light modules in the same direction.

The invention in particular allows two light modules of a lighting apparatus to be displaced together, simultaneously, and the displacement system and the light modules may be arranged in space-saving manner.

It is preferably provided that via a coupling device each control shaft either acts directly on the respective light module on a support bearing the respective light module.

It may be provided that, in particular when viewed in the horizontal direction, the two coupling devices are situated between the two light modules or between the two swivel axes.

The light modules and/or the swivel axes of the light modules are thus located outside of and beside the two coupling devices, wherein one light module is situated on one side (e.g. left or right) and the other light module is situated on the other side (e.g. right or left) of the two coupling devices.

It may further be provided that the coupling devices lie on the longitudinal axis of their respective control shaft.

The coupling devices are preferably positioned at the same height in the vertical direction, wherein the longitudinal axes of the control shafts preferably extend horizontally, so that the longitudinal axes of the control shafts are preferably arranged in the same horizontal plane.

These features typically relate to a displacement system in the installed position in a motor vehicle.

In particular, it is provided that the longitudinal axes of the control shafts extend parallel to each other.

The third rotary element is preferably rotatable about an axis of rotation, wherein the axis of rotation—in the installed position—preferably extends vertically and/or orthogonally to one or both longitudinal axes of the control shaft(s).

In particular, it may be provided that the first rotary element is coupled to the first control shaft and the second rotary element is coupled to the second control shaft, each in such a way that each control shaft is able to move freely along its longitudinal axis relative to its rotary element.

In such a case, the two first rotary elements, in particular crown wheels, are preferably arranged in a fixed position, i.e. immovable, in particular relative to a housing, e.g. the housing of the lighting apparatus, and can "only" rotate.

The problem is further solved with a lighting apparatus as described in the introduction, in particular a motor vehicle headlamp for a motor vehicle, wherein in order to displace the two light modules simultaneously the lighting apparatus is equipped with a displacement system as described earlier.

In particular, it is provided that the two swivel axes—in the installed position of the lighting apparatus—extend vertically.

The light modules can be swiveled horizontally, i.e. to the left and to the right, about these vertical swivel axes.

It may further be provided that each swivel axis of a light module extends orthogonally to the longitudinal axis of the control shaft that is assigned to the light module.

It is often provided that in order to adjust the illumination range, in particular for dynamic illumination range adjustment, the light modules can be swiveled about a vertical-swivel axis—horizontal in the installed position—that extends transversely to the swivel axes.

In this case, it may be favorable if the coupling devices or the respective coupling points of the coupling devices
    lie in the vertical-swivel axis, or
    lie in a horizontal plane that contains the vertical-swivel axis.

Thus, the swivel axes preferably extend orthogonally to this vertical-swivel axis.

It may further be provided that the lighting apparatus has a housing, in which the light modules are located and are arranged so as to be pivotable relative to the housing, and wherein the displacement system is arranged in the housing in such manner that the first and second rotary element, and preferably the third rotary element as well, are arranged so that they are immobile but rotatable relative to the housing.

The lighting apparatus is for example a component of a motor vehicle headlamp or it is embodied as a motor vehicle headlamp.

BRIEF DESCRIPTION OF THE DRAWINGS

In the following text, the invention will be explained in greater detail with reference to the non-limiting drawing. In the drawing

The figures describe the invention with reference to a specific example. However, the statements made in the following text in connection with the displacement of the light modules are valid not only with regard to the specific example, they are generally applicable and not limited to this specific embodiment.

DETAILED DESCRIPTION OF EMBODIMENTS OF THE INVENTION

Figure 1:
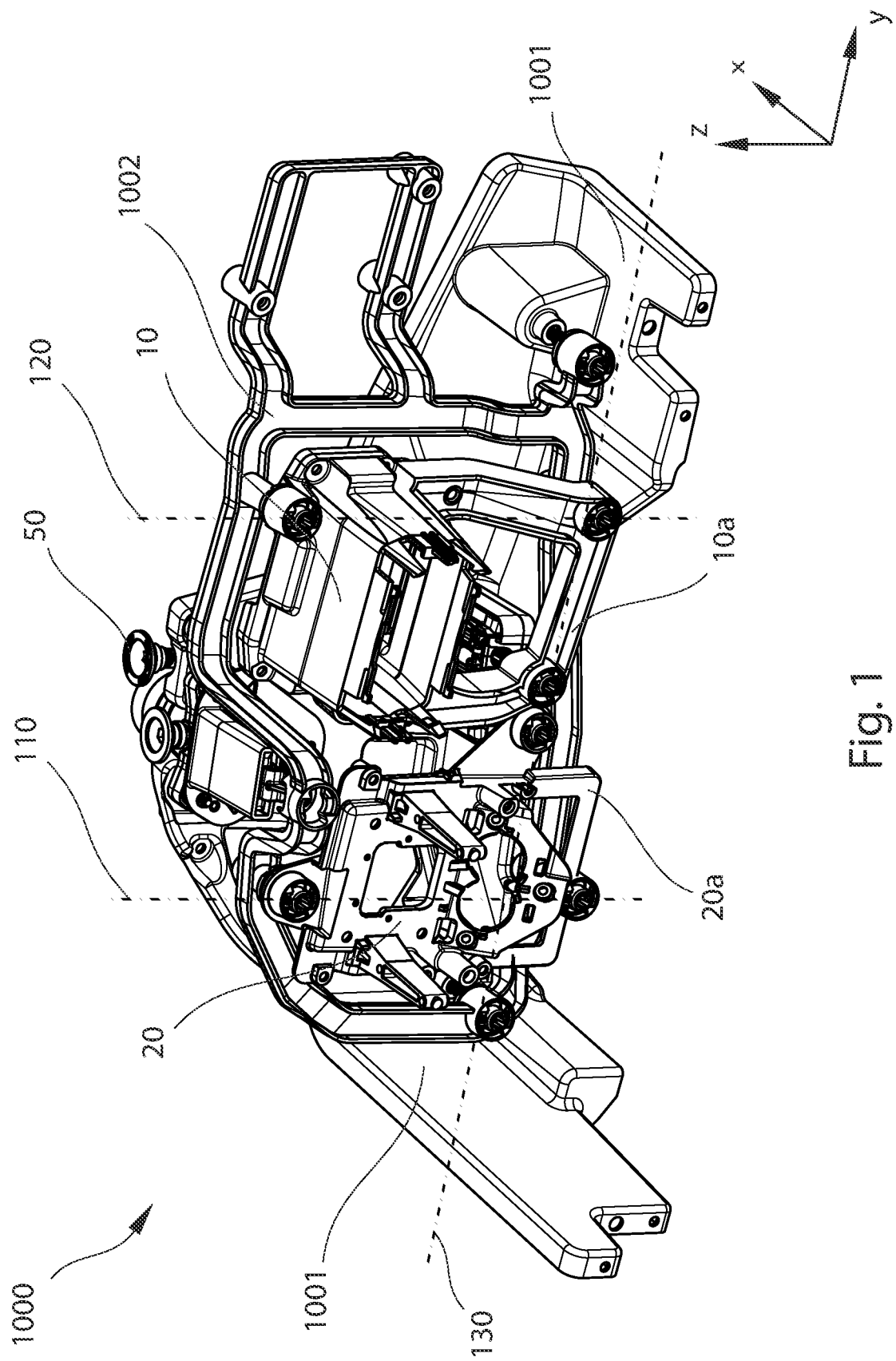
FIG. 1 is a perspective, diagrammatic representation of a lighting apparatus according to the invention in offset front view in the form of a motor vehicle headlamp.

FIG. 1 shows a cutaway partial view of a lighting apparatus 1000, here in the form of a motor vehicle headlamp, in an offset front view. The lighting apparatus 1000 comprises a housing 1001.

There are two modules 10, 20 (only suggested or indicated with a reference numeral line in the figures) arranged inside the housing 1001. The two light modules 10, 20 are each able to swivel about a respective swivel axis 110, 120, so that the direction of the light beam emitted by the light modules 10, 20 can be adjusted laterally (i.e. to the left or right).

In the specific example, the outer light module 20 produces a near field light distribution and a main beam spot, the inner light module 10 produces an asymmetrical dipped light distribution and a segmented main beam distribution.

In the specific example, the light modules 10, 20 are each mounted fixedly in a support 10a, 20a, and the support 10a, 20a is able to swivel about the respective swivel axis 110, 120.

The swivel axes 110, 120 are preferably parallel to each other, and with the lighting apparatus in the installed position the swivel axes 110, 120 are typically vertical, although the person skilled in the art knows that a deviation by a few degrees from this orientation can occur. In general, the light modules and their support are able to swivel directly relative to the housing 1001 of the lighting apparatus 1000 or, as in the present example, they in turn are attached to a common support 1002 and are able to swivel relative to this common support 1002. This support 1002 may itself be able to swivel about a horizontal swivel axis 130, so that the light modules 10, 20 are able to be swiveled together in the vertical direction, i.e., upwards and downwards, to adjust their headlamp range.

When the common support 1002 is in a "zero position", the vertical swivel axes are, for example, vertical as described previously, when the support 1002 is in the swiveled position, evidently the swivel axes 110, 120 are no longer vertical, they have rather been deflected slightly from this position.

Figure 2:
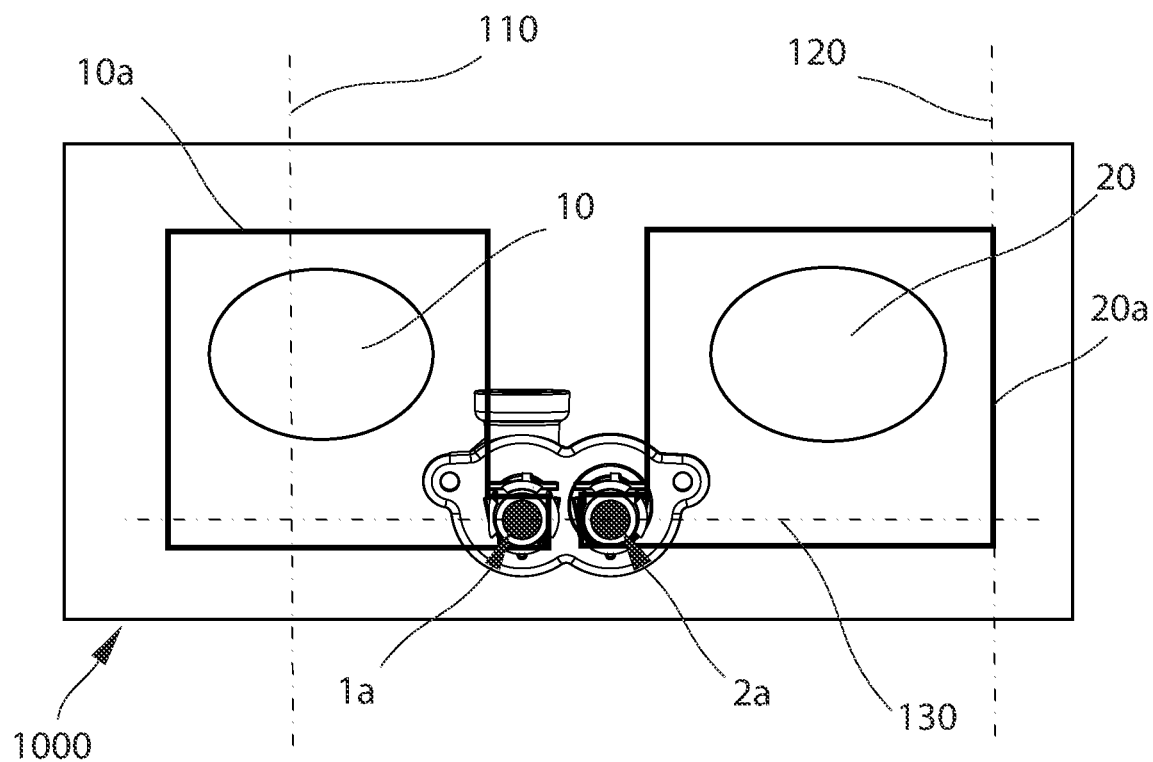
FIG. 2 is a view of the lighting apparatus according to the invention represented purely schematically from the front.

Whereas FIG. 1 shows a perspective view of the lighting apparatus 1000 roughly in direction x-direction—x being approximately the direction of primary light propagation—FIG. 2 shows a view of the lighting apparatus 1000 in direction x, wherein in FIG. 2 the lighting apparatus 1000 is only represented schematically.

In the following text, the operating principle of the present invention will be explained in greater detail with reference to FIG. 2 in conjunction with FIGS. 3-5.

Figure 3:
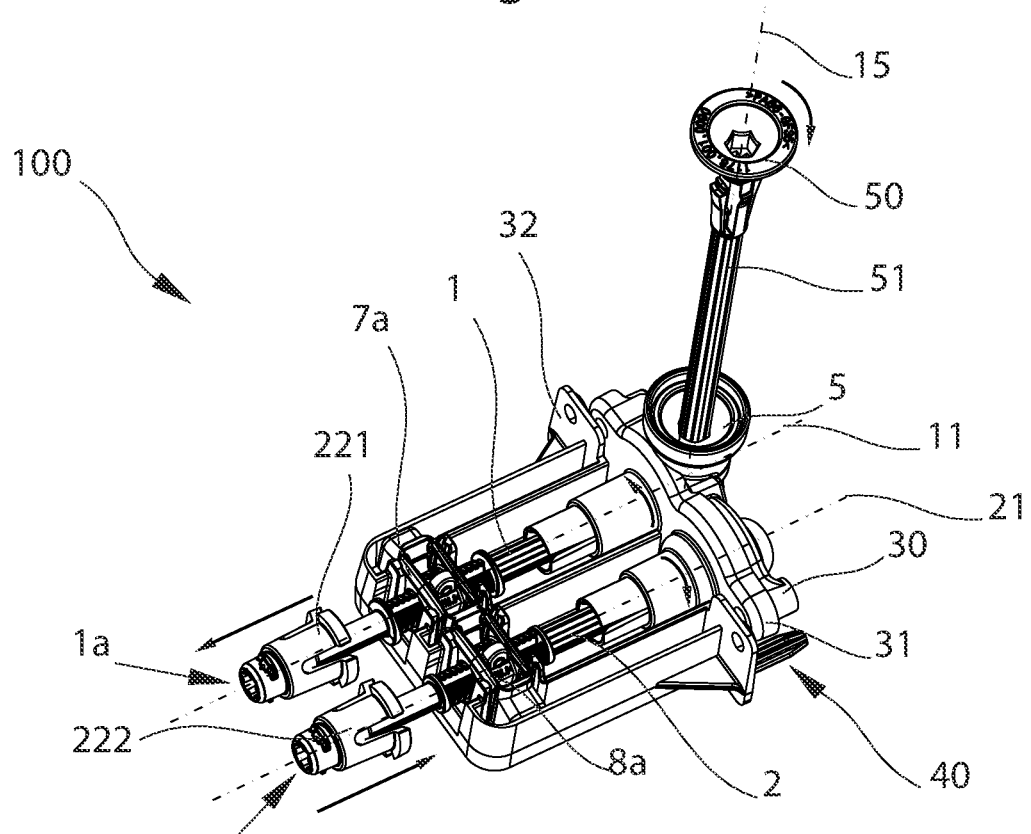
FIG. 3 is a displacement system according to the invention for the lighting apparatus of FIGS. 1 and 2.
Figure 4:
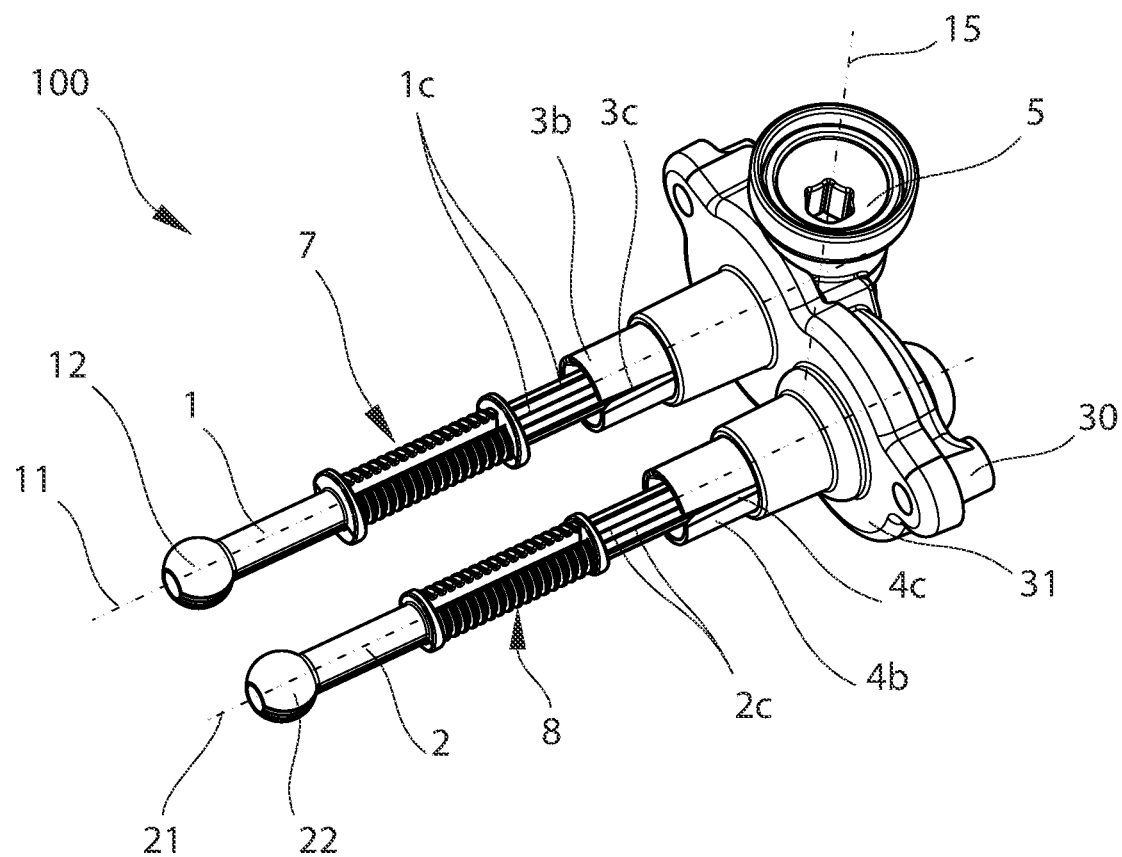
FIG. 4 is a part of the displacement system of FIG. 3.
Figure 5:
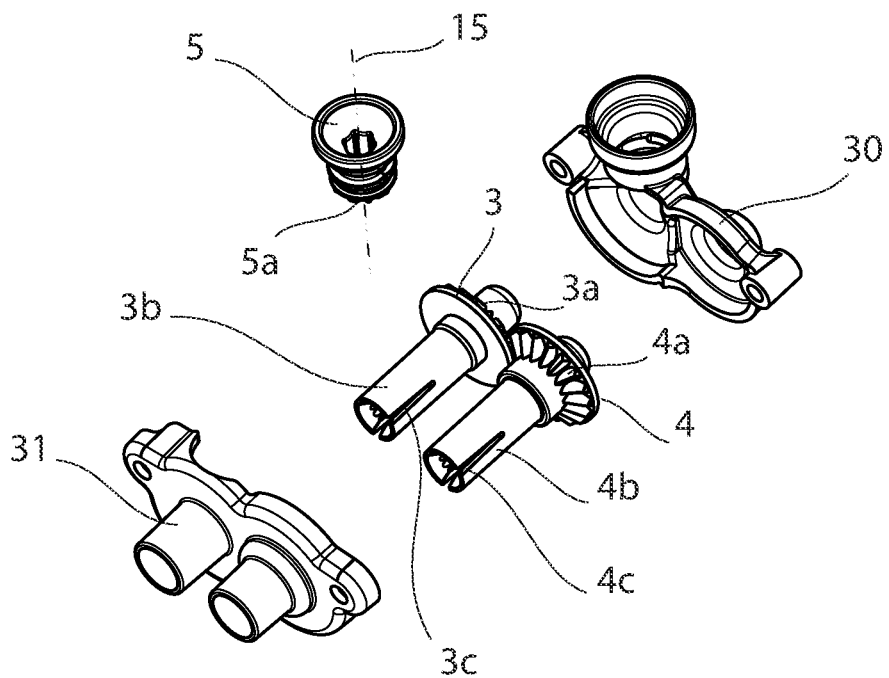
FIG. 5 shows the part of the displacement system represented in FIG. 4 in the disassembled state.

FIGS. 3-5 show a displacement system 100 according to the invention for simultaneous displacement of the two, i.e. the first and the second light modules 10, 20, in detail.

The displacement system 100 comprises a first control shaft 1, which is coupled to the first light module 10, and a second control shaft 2, which is coupled to the second light module 20.

The displacement system 100 includes a displacement system housing 40, which in the example shown consists of a plurality of housing elements 30, 31, 32. The displacement system 100 is connected fixedly to the housing 1001 of the lighting apparatus 1000 via this displacement system housing 40. The displacement system housing 40 is connected to the housing 1001, bolted for example, by means of the housing element 32.

Inside the displacement system housing 40, it may be seen, as shown in FIG. 3, that the first control shaft 1 and the second control shaft 2 are mounted rotatably about their respective longitudinal axes 11, 21. Further, the control shafts 1, 2 are each mounted in such manner that when a control shaft 1, 2 rotates it moves linearly in the direction of its longitudinal axis 11, 21.

As may be seen in FIG. 3 and FIG. 4, each control shaft 1, 2 has for example a threaded section 7, 8 for a corresponding mounting, which cooperates with a mating thread 7a, 8a on the housing part 32 of the displacement system housing 40 in such manner that when the respective control shaft 1, 2 is rotated, it slides linearly in the direction of its longitudinal axis 11, 21, forwards or backwards depending on the direction of rotation, relative to the displacement system housing 40.

The displacement system 100 further comprises a first rotary element, in this example embodied as crown wheel 3 (FIG. 5), and the first control shaft 1 is connected to the first crown wheel 3 in torque-proof manner, such that when the first crown wheel 3 rotates the control shaft 1 is rotated in the direction of rotation of the rotary element 3.

Further, a second rotary element is provided, also embodied as a (second) crown wheel 4, which cooperates with the second control shaft 2 in a similar way.

The two crown wheels 3, 4 are mounted in the housing parts 30, 31 so as to be rotatable but immobile (FIG. 5). The first and second crown wheel 3, 4 in the example shown are also each connected fixedly to a bushing 3b, 4b fix or constructed integrally therewith. The control shafts 1, 2 are pushed into these bushings 3b, 4b and are movable inside the bushings in the longitudinal direction relative thereto, and thus also relative to the crown wheels 3, 4, that is to say they can be displaced in the longitudinal direction.

As illustrated for exemplary purposes in FIG. 4, for this purpose an entrainment device is provided between each control shaft 1, 2 and its allocated bushing 3b, 4b, e.g. one or more protrusions 1c, 2c extending in the longitudinal direction of the control shaft 1, 2, which engage in corresponding, identically aligned depressions 3c, 4c in the bushings 3b, 4b, so that when the crown wheel 3, 4 and therewith the bushing 3b, 4b rotates, the control shaft 1, 2 is also rotated with it, but at the same time is also able to move longitudinally.

Conversely, the protrusions may also be provided on the inside of the bushing and the depressions may be formed on the control shaft, or both the depressions and protrusions may be provided on the control shaft with corresponding protrusions and depressions in the bushing.

The depressions in conjunction with the protrusions that engage in them may preferably also serve as protection against over-rotation.

Additionally, a third rotary element is provided, which in this example is embodied as bevel gear 5. In the example shown, the bevel gear 5 is mounted rotatably in the housing part 30.

The bevel gear 5 cooperates with the first crown wheel 3 in such manner that when the bevel gear 5 rotates, the first rotary element 3 is also rotated. The first crown wheel 3 and the second crown wheel 4 also cooperate in such manner that when the first crown wheel 3 rotates, the second crown wheel 4 is rotated in the opposite direction to the direction of rotation of the first crown wheel 3.

For this purpose, the wheels 3, 4, 5 are furnished with corresponding tooth systems 3a, 4a, 5a, which mesh with each other so that they cooperate as described previously.

Thus, after a turn of the bevel gear 5 the two crown wheels 3, 4 are rotated simultaneously and in opposite directions to each other, with the result that the control shafts 1, 2 move linearly along their respective longitudinal axes 11, 21, in opposite directions.

The thread/mating thread for both control shafts are preferably designed to rotate in he same direction as each other, so that the control shafts (which rotate in opposite directions) move linearly in opposite directions, i.e. in different directions to one another.

The thread pitches for the two control shafts may be identical, so that the control shafts move the same distance linearly. If the normal distance from the coupling point 1a of the first control shaft 1 to the swivel axis 110 of its light module 10 is the same as the normal distance from the coupling point 2a of the second control shaft 2 to the second swivel axis 120, in this case the two light modules are swiveled through the same angle value.

However, the thread pitches may also differ. In this case, the normal distances do not have to be identical; they may be chosen flexibly in coordination with the thread pitches to achieve a swiveling of the light modules about the same swivel angle (value).

The relationships described may also be used to execute shift angles of different sizes.

The crown wheels preferably have an identical diameter, but they may also have different diameters with the result that the crown wheels rotate different distances.

The bevel gear 5, which is typically located inside the housing 1001 of the lighting apparatus 1000 may be turned from the outside, in particular by hand, e.g. with a tool such as a screwdriver, by rotating an adjustment element 50 (FIG. 1, FIG. 3), such as a rotary screw that protrudes from the housing 1001, lies flush therewith or is easily accessible through an opening in the housing. In the specific example, the adjustment element 50 is connected to the bevel gear 5 via a rotating rod 51.

To enable the light modules 10, 20 to swivel in the same direction when the control shafts 1, 2 move in opposite directions, the swivel axes 110, 120 are arranged correspondingly, as will be explained in greater detail in the following text.

Each control shaft 1, 2 is connected via a coupling device 1a, 2a either directly to the respective light module or—as in the example shown—to the respective support 10a, 20a on which the light module 10, 20 is mounted. The coupling device 1a, 2a comprises e.g. a ball head 12, 22 on the end of the control shaft 1, 2, which ball heads 12, 22 engage in corresponding ball sockets 221, 222, which are preferably fixedly connected to the light module 10, 20 or the support 10a, 20a. In this way, and articulated connection is formed between the control shaft and the light module/support.

The two coupling devices 1a, 2a are now positioned between the two light modules 10, 20 or their support 10a, 20a (FIG. 2) or in particular between the two swivel axes 110, 120.

The light modules and/or the swivel axes of the light modules are thus located outside of and beside the two coupling devices, wherein one light module is positioned on one side (e.g. left or right) and the other light module is positioned on the other side (e.g. right or left) of the two coupling devices.

This ensures that the two light modules are swiveled in the same direction even though the control shafts are moving in opposite directions.

As may further be discerned from FIG. 2 and FIG. 3, it may be provided that the coupling devices 1a, 2a each lie on the longitudinal axis 11, 21 of their control shaft 1, 2, and that the coupling devices 1a, 2a are at the same height in the vertical direction (up/down), wherein the longitudinal axes 11, 21 of the control shafts 1, 2 preferably extend horizontally, so that the longitudinal axes 11, 21 of the control shafts 1, 2 preferably lie in a common horizontal plane (provided that the swivel axes 110, 120 truly extend vertically, wherein deviations from this may occur, as explained earlier, e.g. when the common support 102 has swiveled about a horizontal axis 130).

If the two control shafts 1, 2, the associated rotary elements 3, 4 with associated parts such as bushings, and even the threads and mating threads are constructed identically, component diversity can be reduced.

In particular, it is advantageous if the longitudinal axes 11, 21 of the control shafts 1, 2 extend parallel to one another as illustrated.

The bevel gear 5 is rotatable about an axis of rotation 15, wherein the axis of rotation 15—in the installed position—preferably extends vertically and/or orthogonally to one or both longitudinal axes 11, 21 of the control shaft(s) 1, 2.

It may be provided in particular that the swivel axes 110, 120 of the light modules 10, 20 extend orthogonally to the longitudinal axis 11, 21 of the control shaft 1, 2 assigned to the light module 10, 20.

The coupling devices 1a, 2a and the respective coupling points of the coupling devices 1a, 2a preferably line in the horizontal vertical-swivel axis 130 of the support 1002 or in a horizontal plane that comprises the vertical-swivel axis 130.

In the embodiment that is described and illustrated, the attack points of the coupling elements are located midway between the two light modules. One swivel axis 110 extends through the light module 10, the other swivel axis 120 on the outer edge of the light modules 20 (and their supports).

The invention claimed is:

1. A displacement system (100) for simultaneous displacement of a first and a second light module (10, 20) of a lighting apparatus (1000),
    wherein the first light module (10) is mounted so that the first light module can swivel about a first swivel axis (110) and the second light module (20) is mounted so that the second light module can swivel about a second swivel axis (120),
    wherein the first and second swivel axes (110, 120) extend parallel to each other, wherein the displacement system (100) comprises:
        a first control shaft (1) which is coupled to the first light module (10), and
        a second control shaft (2) which is coupled to the second light module (20),
    wherein the first control shaft (1) and the second control shaft (2) are mounted so that the first and second control shafts can rotate about their respective longitudinal axis (11, 21), wherein the first and second control shafts (1, 2) are each mounted in such manner that when the first or second control shaft (1, 2) rotates, the first or second control shaft moves linearly in the direction of its longitudinal axis (11, 21),
    wherein the first control shaft (1) is connected in torque-proof manner to a first rotary element (3), which is embodied as a crown wheel, so that when the first rotary element (3) rotates, the first control shaft (1) is rotated in the direction of rotation of the first rotary element (3), and
    wherein the second control shaft (2) is connected in torque-proof manner to a second rotary element (4), which is embodied as a crown wheel, so that when the second rotary element (4) rotates, the second control shaft (4) is rotated in the direction of rotation of the second rotary element (4), and
    wherein a third rotary element (5) is provided, which is embodied as a bevel gear, and which cooperates with the first rotary element (3) in such manner that when the third rotary element (5) rotates the first rotary element (3) is also rotated, and
    wherein the first rotary element (3) and the second rotary element (4) cooperate in such manner that when the first rotary element (3) rotates, the second rotary element (4) is rotated in the opposite direction to the direction of rotation of the first rotary element (3), and
    wherein the first and the second control shaft (1, 2) are mounted in such manner that as a consequence of the rotations of the first and second rotary elements (3, 4) caused by the rotation of the third rotary element (5), they move linearly and in opposite directions along their respective longitudinal axes (11, 21), and wherein the first and second swivel axes (110, 120) extend in such manner that the two light modules (10, 20) are swiveled simultaneously and in the same direction about their respective first and second swivel axis (110, 120), and
    wherein the first, second, and third rotary elements (3, 4, 5) comprise corresponding tooth systems (3a, 4a, and 5a) which mesh with each other and cooperate such that rotation of the third rotary element (5) rotates the first rotary element (3) which rotates the second rotary element (4) in the opposite direction of the rotation of the first rotary element (3).

2. The displacement system according to claim 1, wherein each control shaft (1, 2) act via a coupling device (1a, 2a), either directly on the respective light module or on a support (10a, 20a) on which the respective light module (10, 20) is mounted.

3. The displacement system according to claim 2, wherein the two coupling devices (1a, 2a), lie between the two light modules (10, 20) or between the two swivel axes (110, 120) when viewed in the horizontal direction.

4. The displacement system according to claim 2, wherein the coupling devices (1a, 2a) each lie on the longitudinal axis (11, 21) of the first or second control shaft (1, 2).

5. The displacement system according to claim 2, wherein the coupling devices (1a, 2a) are positioned at the same height in the vertical direction, wherein the longitudinal axes (11, 21) of the first and second control shafts (1, 2) extend horizontally, so that the longitudinal axes (11, 21) of the first and second control shafts (1, 2) lie in a common horizontal plane.

6. The displacement system according to claim 1, wherein the longitudinal axes (11, 21) of the first and second control shafts (1, 2) extend parallel to each other.

7. The displacement system according to claim 1, wherein the third rotary element (5) is rotatable about an axis of rotation (15), wherein, in the installed position, the axis of rotation (15) extends vertically and/or orthogonally to one or both longitudinal axes (11, 21) of the first and second control shaft(s) (1, 2).

8. The displacement system according to claim 1, wherein the first rotary element is coupled with the first control shaft and the second rotary element is coupled with the second control shaft in such manner that each control shaft is able to move freely along its longitudinal axis relative to its rotary element.

9. A lighting apparatus for a motor vehicle, the lighting apparatus comprising:
    a first and a second light module (10, 20), wherein the first light module (10) is mounted to be able to swivel about a first swivel axis (110) and the second light module (20) is mounted to be able to swivel about a second swivel axis (120), wherein the first and second swivel axes (110, 120) extend parallel to each other, wherein the lighting apparatus (1000) has a displacement system (100) according to claim 1 for the simultaneous displacement of both first and second light modules (10, 20).

10. A lighting apparatus according to claim 9, wherein with the lighting apparatus in the installed position the first and second swivel axes (110, 120) extend vertically.

11. A lighting apparatus according to claim 9, wherein each swivel axis (110, 120) of a light module (10, 20) extends orthogonally to the longitudinal axis (11, 21) of the control shaft (1, 2) associated with the light module (10, 20).

12. A lighting apparatus according to claim 9, wherein for dynamic adjustment of the headlamp range the light modules (10, 20) can be swiveled about a vertical-swivel axis (130) which in the installed position is horizontal and extends transversely to the first and second swivel axes.

13. A lighting apparatus according to claim 12, wherein the coupling devices (1*a*, 2*a*) and the respective coupling point of the coupling devices (1*a*, 2*a*):
- lie in the vertical-swivel axis (130), or
- lie in a horizontal plane that comprises the vertical-swivel axis (130).

14. A lighting apparatus according to claim 9, wherein lighting apparatus (1000) includes a housing (1001) in which the light modules (10, 20) are situated and are mounted to as to be able to swivel relative to the housing (1001), and wherein the displacement system (100) is arranged inside the housing (1001) in such manner that the first and the second rotary element, and the third rotary element as well, are arranged in the housing in fixed position but rotatably.

15. A lighting apparatus according to claim 9, wherein the lighting apparatus is a component of a motor vehicle headlamp or is embodied as a motor vehicle headlamp.

* * * * *